US012524376B2

(12) United States Patent
Mahadik et al.

(10) Patent No.: US 12,524,376 B2
(45) Date of Patent: Jan. 13, 2026

(54) METHOD OR APPARATUS FOR SCALABLE FILE VERIFICATION IN A DEDUPLICATED FILESYSTEM

(71) Applicant: Dell Products L.P., Round Rock, TX (US)

(72) Inventors: Pooja Mahadik, Pune (IN); Smriti Thakkar, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/427,576

(22) Filed: Jan. 30, 2024

(65) Prior Publication Data

US 2025/0245201 A1 Jul. 31, 2025

(51) Int. Cl.
*G06F 16/174* (2019.01)
*G06F 16/13* (2019.01)

(52) U.S. Cl.
CPC ........ *G06F 16/1748* (2019.01); *G06F 16/137* (2019.01)

(58) Field of Classification Search
None
See application file for complete search history.

(56) References Cited

U.S. PATENT DOCUMENTS

| | | | | |
|---|---|---|---|---|
| 6,393,428 B1* | 5/2002 | Miller | ............... | G06F 16/325 707/999.102 |
| 8,904,137 B1* | 12/2014 | Zhang | ............... | G06F 3/067 711/165 |
| 9,367,448 B1* | 6/2016 | Botelho | ............... | G06F 12/0253 |
| 10,108,544 B1* | 10/2018 | Duggal | ............... | G06F 11/14 |
| 11,615,813 B1* | 3/2023 | Goker | ............... | G11B 20/182 714/699 |
| 2013/0318051 A1* | 11/2013 | Kumar | ............... | G06F 16/137 707/692 |
| 2016/0110261 A1* | 4/2016 | Parab | ............... | G06F 16/174 707/692 |
| 2018/0253438 A1* | 9/2018 | Zaydman | ............... | G06F 16/137 |
| 2019/0188184 A1* | 6/2019 | Chittaro | ............... | G06F 16/152 |
| 2019/0272337 A1* | 9/2019 | Stewart | ............... | G06F 16/2282 |
| 2020/0019623 A1* | 1/2020 | Wong | ............... | G06F 16/137 |
| 2020/0133719 A1* | 4/2020 | Chinthekindi | ............... | G06F 3/0644 |
| 2020/0133720 A1* | 4/2020 | Chinthekindi | ............... | G06F 9/4875 |
| 2020/0177390 A1* | 6/2020 | Yang | ............... | H04L 9/3236 |

(Continued)

*Primary Examiner* — Van H Oberly
*Assistant Examiner* — Navneet Gmahl
(74) *Attorney, Agent, or Firm* — Workman Nydegger

(57) ABSTRACT

One example method includes calculating a size of a fingerprint hashtable, calculating a number of verification passes that are needed, partitioning a fingerprint index table into index ranges corresponding to the number of verification passes needed, and during each verification pass for each index range: (1) finding all Ln segments in a namespace, and adding the Ln segments to the fingerprint hashtable and to a walk-vector data structure, (2) scanning a container set and locating any Ln segments in the container set; (3) reading all Ln-1 segments pointed to by the Ln segments and adding the Ln-1 segments to the fingerprint hashtable and to the walk-vector data structure; (4) repeating 1-3 for all levels of the tree structure that include Ln segments; and (5) comparing the fingerprint hashtable with the portion of the fingerprint index table corresponding to the index range to identify any missing Ln segments.

20 Claims, 6 Drawing Sheets

(56) References Cited

U.S. PATENT DOCUMENTS

| | | | |
|---|---|---|---|
| 2020/0250083 A1* | 8/2020 | Shilane | G06F 3/0652 |
| 2020/0310686 A1* | 10/2020 | Truong | G06F 3/061 |
| 2020/0310964 A1* | 10/2020 | Lu | G06F 3/0608 |
| 2020/0310965 A1* | 10/2020 | Brandt | G06F 3/061 |
| 2020/0322159 A1* | 10/2020 | Xu | H04L 9/0637 |
| 2020/0328886 A1* | 10/2020 | Newton | H04L 9/0819 |
| 2020/0374301 A1* | 11/2020 | Manevich | G06F 16/2379 |
| 2020/0382315 A1* | 12/2020 | Lakk | H04L 9/3247 |
| 2021/0124716 A1* | 4/2021 | Chinthekindi | G06F 16/188 |
| 2021/0374124 A1* | 12/2021 | Duggal | G06F 16/9535 |
| 2022/0326867 A1* | 10/2022 | Thakkar | G06F 12/0253 |
| 2022/0365695 A1* | 11/2022 | Zhang | G06F 3/0679 |
| 2024/0020273 A1* | 1/2024 | Thakkar | G06F 16/1748 |
| 2024/0223381 A1* | 7/2024 | Hwang | H04L 9/30 |
| 2024/0264752 A1* | 8/2024 | Carr | G06F 3/067 |

* cited by examiner

METHOD OR APPARATUS FOR SCALABLE FILE VERIFICATION IN A DEDUPLICATED FILESYSTEM

FIELD OF THE INVENTION

Embodiments of the present invention generally relate to data protection. More particularly, at least some embodiments of the invention relate to systems, hardware, software, computer-readable media, and methods for identifying files that are impacted by a data loss.

BACKGROUND

Data backup systems are typically the last resort for data recovery. If the primary copy of the data is lost, it is recovered from secondary storage, such as a data backup system. If the backup copy of the data is lost, it may not be possible to recover the lost data, since that is the last copy of the data. Hence, it is important for backup solutions to provide data protection and integrity capabilities. A data backup system such as Data Domain may provide data invulnerability architecture at every component in the file system to guard against data loss. However, if there is a data loss, all the missing segments need to be identified and listed, so that the impacted files can be identified and removed from the system. The backup copies of the impacted files can then be recovered from the primary system, or from a data replication system. However, it can be difficult, or impossible, to identify and list the missing segments and, thus, which files are impacted by the data loss.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1A:
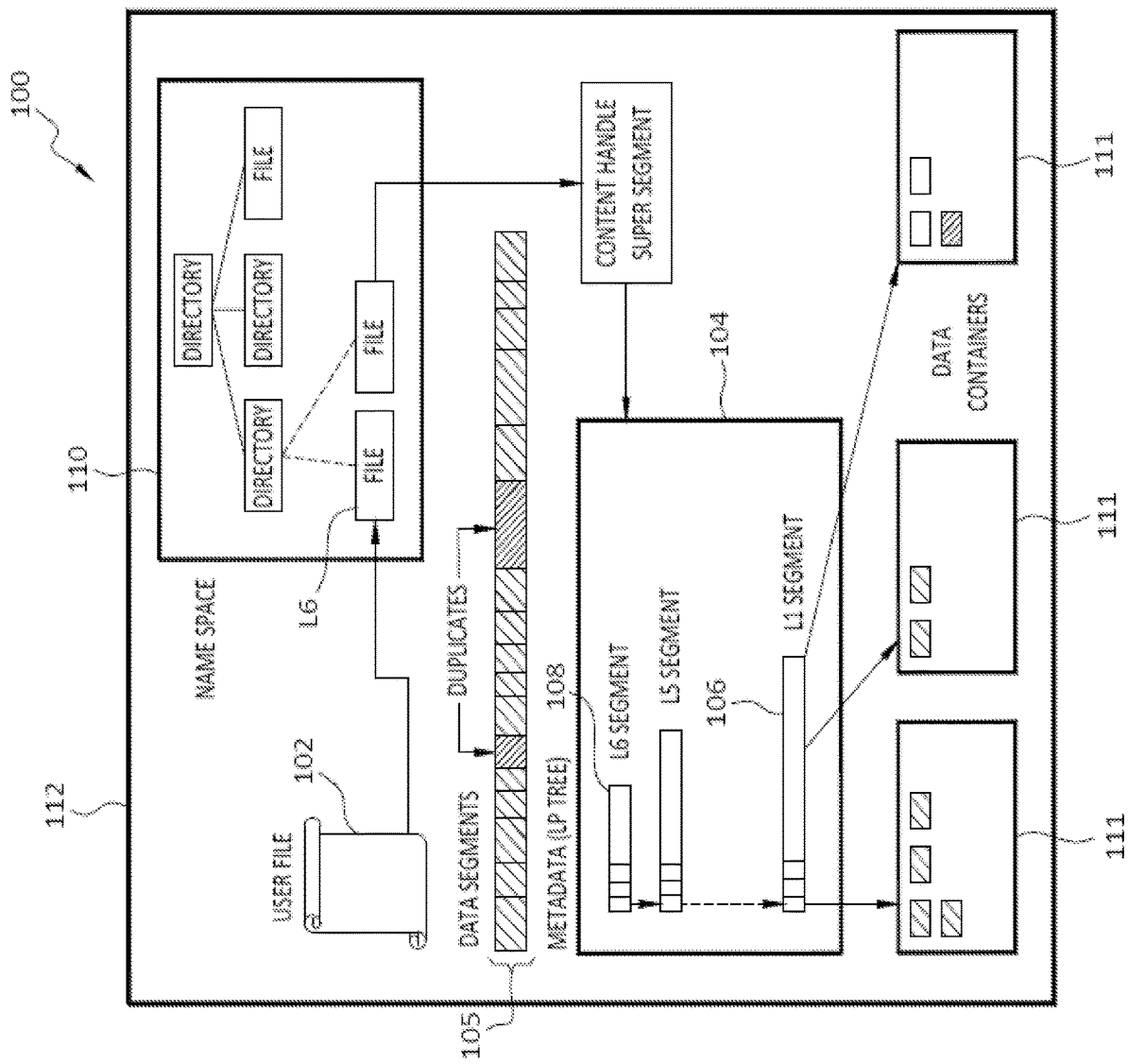
FIG. 1A discloses aspects of a data storage/backup approach according to some example embodiments.

Embodiments of the present invention generally relate to data protection. More particularly, at least some embodiments of the invention relate to systems, hardware, software, computer-readable media, and methods for identifying files that are impacted by a data loss. For example, some embodiments are directed to a method and apparatus that are operable to identify all the missing metadata and data segments in a deduplicated filesystem. By knowing which metadata and data segments are missing, it may be possible to then identify the file(s) impacted by a data loss. The identified files may then be removed from the filesystem, and their respective backups restored from a data protection system.

Some example embodiments of the invention are directed to an algorithm that is executable to verify metadata and data and identify missing data segments, or simply 'segments,' and the impacted files in the filesystem. The algorithm may employ a fingerprint hashtable as a data structure. The fingerprint (Fp) hashtable may include fingerprints, such as hashes for example, of the segments in a file. Data segment fingerprint inserts and deletes to this hashtable are O(1) that is, the time for some embodiments of the algorithm to perform these operations is the same regardless of how many inserts or deletes are performed. As a result of a verification of fingerprints for data segments of a Merkle tree, that represents a file, the hashtable may be determined to contain live references, that is, fingerprints, that do not have the corresponding segments in the container set. These are the missing segments. The missing segments may then be used to identify a file that has been impacted by a data loss in the system. The impacted file may be removed from the system, and a backup copy of that file restored.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) orsolution(s). Finally, it is not required that any embodiment implement any of the advantageous and unexpected effects disclosed herein.

For example, one advantageous aspect of at least some embodiments of the invention is that an embodiment may perform a physical scan of a container set, rather than performing a logical verification for each file. Since this physical scan may be a breadth-first scan (BFS) rather than a depth-first scan (DFS), the BFS may avoid traversing duplicate segments repeatedly, so that the scan proceeds relatively more quickly than if a DFS were performed. An embodiment may operate to identify segments missing as a result of a data loss event, and may employ metadata about those segments to determine which files have been impacted by the data loss event. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Context for Some Example Embodiments

It is noted that while this disclosure may reference the Dell EMC Data Domain File System (DDFS), such reference is only by way of illustration, and is not intended to limit the scope of the invention in any way. Embodiments of the invention may be implemented in other data protection systems as well.

The DDFS is an inline data deduplication file system. As data gets written to the file system, DDFS breaks the data into variable sized segments, and a group of segments is packed into a compression region. Compression regions are grouped together and written as a container to disk. DDFS calculates fingerprint signatures for each segment using SHA1 algorithm, although other hash algorithms could be used. DDFS has an on-disk fingerprint index table, which maps each fingerprint to the container-id, that has the corresponding data segment. The container has a metadata section followed by a group of data sections. The data sections store the compression regions. The container metadata section stores the metadata information of the container, that is, the container metadata section stores the total number of compression regions, the total number of segments, the fingerprint of each segment, and the encryption and compression information of the compression regions as well.

The on-disk fingerprint index table is a hashtable. The number of buckets in the fingerprint index hashtable are sized to hold all fingerprints in the deduplicated filesystem including unique and duplicate fingerprints. The on-disk fingerprint index table in Data Domain Filesystem has the ability to grow as well. So, depending on the storage capacity of the system, The on-disk fingerprint index table can have millions of buckets or index ranges. Many fingerprints can hash to the same bucket or index range. So, an index bucket or range can have many fingerprint entries.

As shown in the example configuration 100 of FIG. 1A, which discloses a segment tree representation of a file 102, the file 102 in the Data Domain File System (DDFS) is represented by a tree 104, which may be a Merkle tree, with user data as variable sized data segments 105 at the bottom level of the tree 104, referred to as L0 segments. The SHA1 fingerprints of the L0 segments are grouped together at the next higher level of the tree 104 to form new segments, referred to as L1 segments 106. SHA1 fingerprints of L1 segments are grouped together as L2 segments, and this continues up to the L6 segment, which represents the entire file 102. The top segment of the tree 104 is always an L6 segment 108, even though the L6 segment may refer to any lower numbered segments. Segments above L0, that is, segments at levels L1 through L5 of the tree 104, may be referred to as Lp chunks or metadata segments. The L6 segment 108 of every file 102 is stored in a namespace 110 which is represented as a B+ Tree. The L0 and Lp segments are written to separate containers, known as L0 and Lp containers. Some example containers are indicated at 111.

The storage unit that runs DDFS and stores data may be referred to as the active-tier 112. Data domain, and other data protection platforms, may have a cloud-tier capability that allows applications to move data from on-premise active-tier 112 to a cloud tier. In the example of DDFS, at least, a single namespace 110 spans both active and cloud tiers. One or more of the containers 111 may be a CMETA container, an example of which is disclosed at 200 in FIG. 2.

When a file is moved from active to cloud-tier, the location information of the file referring to cloud object storage is stored in the namespace 110. For cloud-tier, a container, referred to as a CMETA container 200, may be used which stores the metadata sections 202 of multiple L0 and Lp containers. DD (Data Domain) adopts a meta-separated architecture to store the metadata in the local storage, and the actual data in the cloud object store. The metadata is stored locally, rather than in the cloud, to avoid cloud reads during ingest for deduplication and during garbage collection for enumeration. The local metadata may comprise Lp containers and CMETA containers 200.

Figure 2:
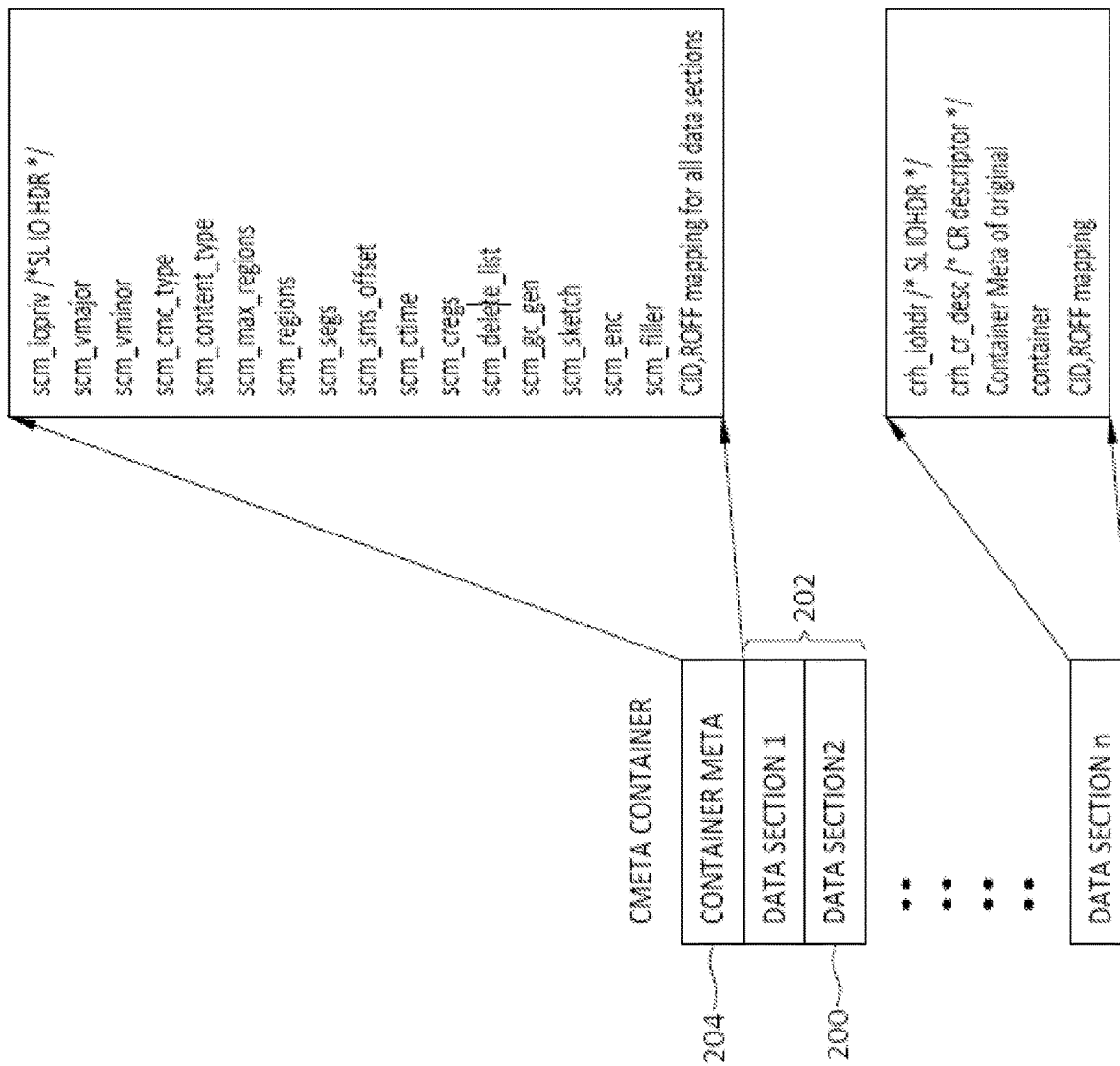
FIG. 2 discloses aspects of an example container that may be employed in example embodiments.

The L0 containers, whose metadata sections 202 may be stored in a CMETA container 200, are stored directly in the cloud. One cloud-tier approach stores each compression region of an L0 container as an individual object in the cloud. Another cloud-tier approach stores the entire L0 container as a single object in the cloud, thus substantially reducing the total number of objects in the cloud, by increasing the object size. FIG. 2 shows the CMETA 200 on-disk format. As shown in the CMETA on-disk format, the CMETA container 200 may store, in addition to the metadata sections 202 of multiple L0 and Lp containers, metadata 204 about the CMETA container 200 itself.

DDFS has a Data Invulnerability Architecture (DIA) that is used to ensure the integrity of data in the presence of software and hardware failures. As a part of this architecture, the filesystem has to ensure the integrity of segments, segment references, that is, references between segment levels of a tree such as the tree 104, and the fingerprint index (FP Index) table such as the FP index table 130 shown in FIG. 1B Segments are stored inside containers, segment references are stored inside the metadata segments, and user data is stored in data segments. Metadata segments and the data segments are called Lp and L0, respectively. The FP Index table stores the mapping from the fingerprints to respective container IDs. A segment is considered to be a live segment if it is referenced by another live segment. Further, an L6 segment is considered to be live if there is a corresponding file in the namespace, that is, a file to which the L6 segment corresponds.

Figure 1B:
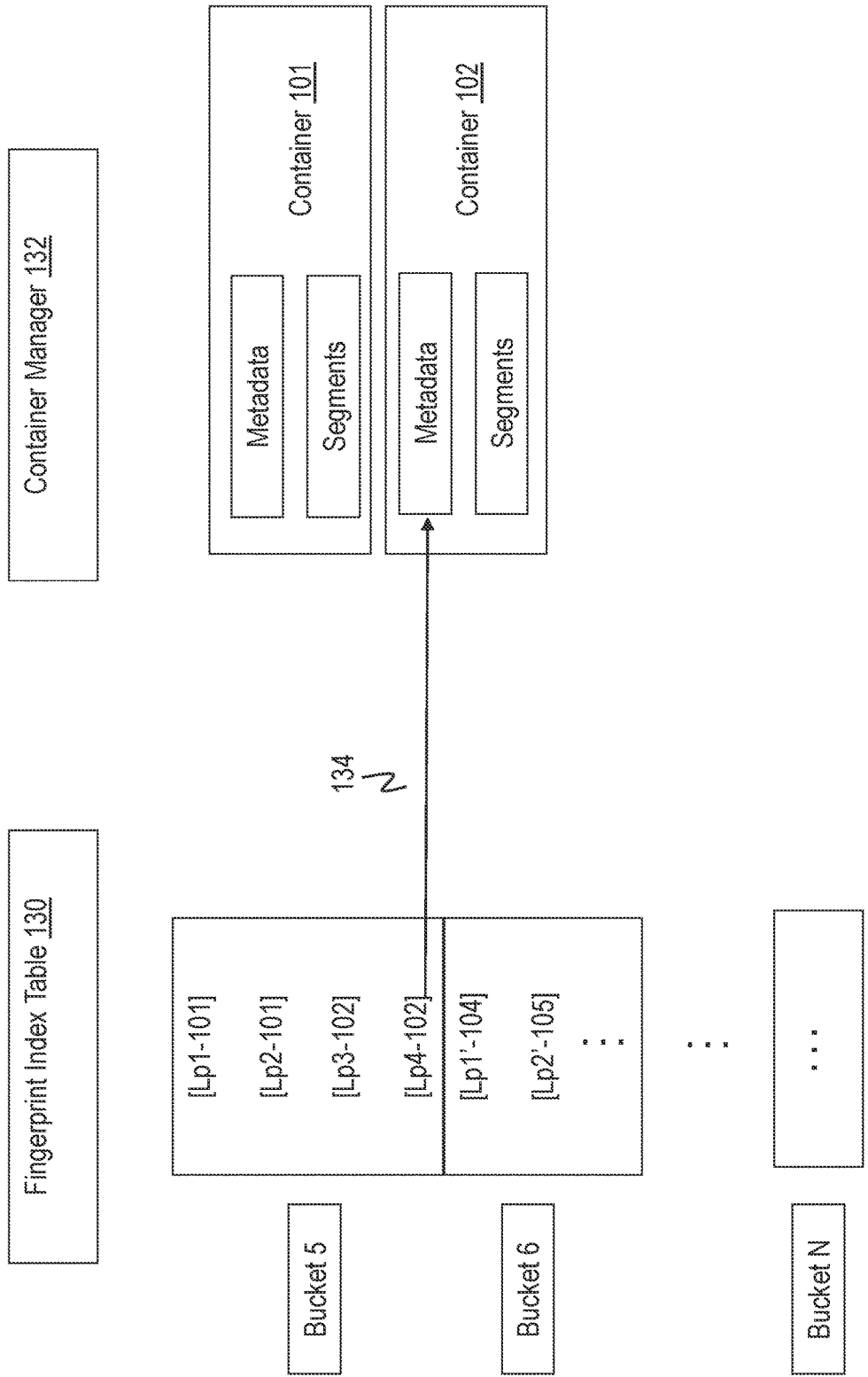
FIG. 1B discloses aspects of a fingerprint index table according to some example embodiments.

For example, FIG. 1B shows an embodiment of an FP index table 130. The FP index table 130 includes fingerprint entries for segments [Lp+L0] in the DDFS. The FP index table 130 is organized into N number of buckets and each bucket holds a fixed number of [fingerprint, container ID] entries. For example, a bucket 5 includes the [fingerprint, container ID] entries [Lp1-101], Lp2-101], Lp3-102], and lp4-104], the bucket 6 includes the [fingerprint, container ID] entries [Lp1'-104] and Lp2'-105] and so on as illustrated by the ellipses.

A container manager 132 manages the containers, for example a container 101 and container 102, that correspond to the container IDs FP index table 132. The FP index table 130 includes a mapping to the container that holds the content of each segment included in the FP index table. For example, the FP index table 130 for bucket 5 includes the container ID that specifies the container 102 that holds the content of the L4 segment as shown at 134. Thus, the FP index table 130 can be used to lookup the container that contains the content of any segment as needed. If, for example, an L5 segment is looked up and is actually read from a container, it will point to the L4 references. Accordingly, the FP index table 130 includes a mapping of a segment and container pair for each fingerprint included in the index table.

One way to maintain data integrity is to ensure that fingerprints in the FP Index table 130 have segments corresponding to them in containers, and to ensure that segment references stored inside metadata segments point to segments inside the containers. Thus, DDFS maintains two DIA invariances: (1) there is a one-to-one mapping between the (segment, container) pair and the FP index table; and (2) the segment should exist if there is a live reference to that segment. In some cases, inconsistency between the FP Index table, segments, and/or references, can occur due to hardware or software bugs, for example.

Example embodiments of the invention may assume that a data protection system, such as DDFS for example, adheres to the DIA invariance (1), that is, there is another apparatus that finds inconsistencies between the FP Index table and the container set. More particularly, DDFS periodically computes, such as during a garbage collection procedure, the entire FP Index table checksum and compares that checksum against the segment checksum. A checksum mismatch is flagged by DDFS and the missing segments are identified by a separate procedure.

C. Aspects of Some Example Embodiments

In general, some example embodiments of the invention may assume that DIA invariance (1), discussed above, is adhered to. That is, the FP index table and container set are in sync, and all fingerprints listed in the FP index table are in the container set. Some example embodiments are directed to methods and algorithms that ensure that DIA invariance (2) holds for both Lp metadata segments and L0 data segments. In general, a live L0 and Lp segment should exist in the FP index table and a container if there is a live reference to that L0 or Lp segment. If a L0 or Lp segment does not exist, methods according to example embodiments may operate to identify the missing segments, and to list the files impacted by the loss of a metadata segment or a data segment.

Some example embodiments utilize a partitioning approach that is scalable for complete L0 and Lp segment verification of large capacity duduplicated storage systems. Partitioning allows for insufficient RAM memory or on-disk space to be addressed as the number of Lp metadata segments and L0 data segments increase. Partitioning is done by dividing the FP index table (e.g., FP index table 130) into multiple index buckets or ranges based on the available disk space and scanning the container set each time for every index range. The container set scan is done in a breath first, physical manner, which is an optimization over logical scanning of the container set as breath first scanning it avoids traversing duplicate segments repeatedly, thus making breath first scanning a faster approach.

C.1 Identification of Missing Ln Segments

Figure 3A:
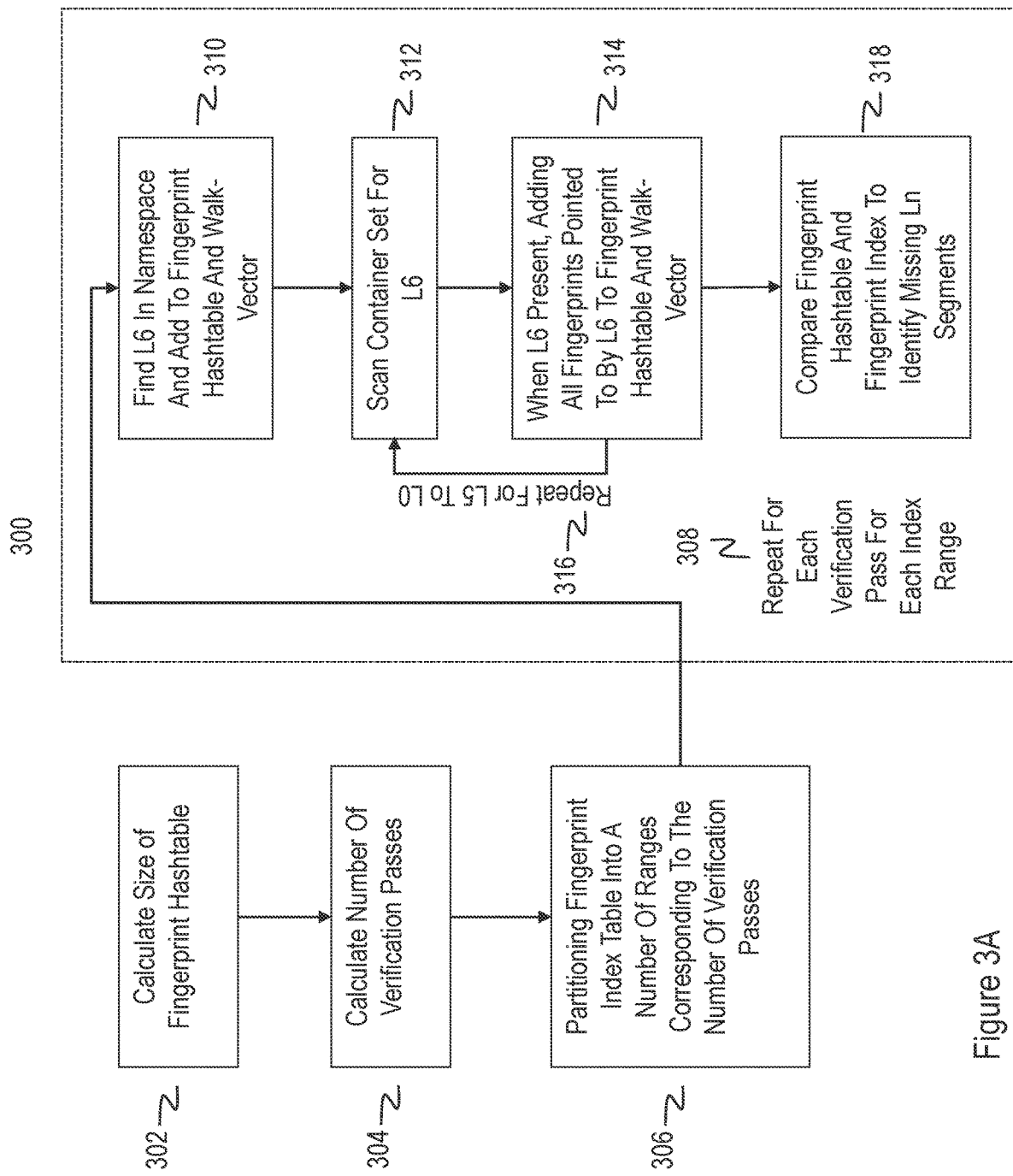
FIG. 3A discloses an example method for identifying missing segments.

With attention now to FIG. 3A, aspects of an example method 300 for identifying missing Ln segments are disclosed. Note that the example method 300 assumes an Li segment tree level where 0<i<=6, although larger/smaller values of i could be used, and the example method 300 further assumes that a directory manager, that is, a namespace, contains the references to L6s that are live inside the filesystem. The method 300 may be performed in a data deduplication environment that includes a local tier and/or a cloud storage tier. In some instances, the method 300 may be performed by a data deduplication server. In general, however, no particular entity, or entities, are required to perform the method 300. Finally, it is noted that, as used herein, a 'fingerprint' such as may be created by hashing a data segment with a hashing algorithm is an example of a 'metadata segment' or a 'data segment.'

As shown by in FIG. 3A, the method 300 begins by calculating 302 a size of an in-memory fingerprint (FP) hashtable. In one embodiment, this is done by obtaining a total count of Lp and L0 segments in a namespace that includes an FP index, as well as the available RAM and on-disk space, and then use this information to calculate the FP hashtable size.

Next, a determination 304 is made of a number of verification passes needed to perform verification of all of the Lp and L0 segments in the namespace. In one embodiment, this is done by checking if all of the Lp and L0 segments in the namespace will fit in the available on-disk space determined in 302. If the fingerprints of all of the Lp and L0 segments can fit in the available on-disk space, then the following steps of the method 300 can be done in a single verification pass. In other words, a determination is made that only one verification pass is needed.

However, if fingerprints of all of the Lp and L0 segments do not fit in the available on-disk space, then multiple verification passes are needed to perform the following steps of method 300. To determine the number of verification passes that are needed, the amount of on-disk space needed to save fingerprints of all of the Lp and L0 segments is divided by the available on-disk space and the result is the number of verification passes needed to perform verification of all of the Lp and L0 segments in the namespace.

Next, the fingerprint index table is partitioned 306 into a number of index ranges that correspond to the number of verification passes needed to perform verification of all of the Lp and L0 segments in the namespace. A start and a stop value for each of the index ranges is also determined. In an embodiment, the number of partitions for the index ranges are determined by dividing a total number of the index ranges or buckets by the number of verification passes needed. For example, suppose that in the embodiment there are 24 million index buckets, and the total number of verification passes needed was 3, then each index range would be 8 million. Thus, during a first verification pass, 0 to 8 million index buckets will be considered, during a second verification pass, 8 million to 16 million index buckets will considered, and during a third verification pass, 16 million to 24 million index buckets will considered.

As shown at 308 and illustrated by the dashed box around method steps 310-318, the method steps 310-318 are performed repeatedly for each verification pass of each index range. Thus, in the embodiment above, method steps 310-318 are performed on the 0 to 8 million index buckets during the verification pass, method steps 310-318 are performed on the 8 million to 16 million index buckets during the second verification pass, and method steps 310-318 are performed on the 16 million to 24 million index buckets during the third verification pass. Of course, for embodiments where there are more than three index ranges and three verification passes, the method steps 310-318 will be repeated for each additional index range during each additional verification pass. It will be noted that when only one verification pass is needed, then partitioning does not occur as all of the index buckets can be considered as one index range that will be subjected to the method steps 310-318.

The method 300 maywalk 310 a directory manager, such as a namespace for example, finding any live L6 metadata segments, where L6 is the highest level of the tree structure such as tree 104, and then adding those live L6 metadata segments to an FP hashtable and to a walk-vector data structure that is structured to keep track of Ln segments to read and Ln segments for which a read is completed. In one embodiment, the walk-vector data structure uses two bits, one to indicate which Ln segments need to read and one to indicate which Ln segments have been read.

Next, a container set may be scanned 312 for any L6 segments. For all L6 segments that are present in the walk-vector data structure, those L5 segments, where L5 is next level of the tree structure below L6, that are pointed to by the L6 segments are added 314 to the FP hashtable and to the walk-vector data structure. The method steps 312 and 314 may then be successively repeated 316 for the L5, L4, L3, L2, L1 and L0 segments. Thus, all of the fingerprints of the segments that are included in the current index range determined in step 306 are added to the in-memory FP hashtable. If the in-memory FP hashtable become full during the process, it can be dumped to an on-disk file. Since the sized of the FP hashtable was determined based on available on-disk space, there will not be an issue with insufficient disk space.

The method 300 concludes for a given index range when all segments of the tree structure have checked by identifying 318 missing segments by comparing the fingerprint entries in the FP hashtable, which may be considered enumerated fingerprints, with the fingerprint entries in the fingerprint index table (e.g., FP index table 130). Any fingerprint entries that are included in the fingerprint index table but are not included in the FP hashtable, then those segments are missing segments. That is, these segments are listed as being part of the fingerprint index file, but are not actually found in the container set.

C.2 Identification of Files Impacted by Missing Lp Segments

Figure 3B:
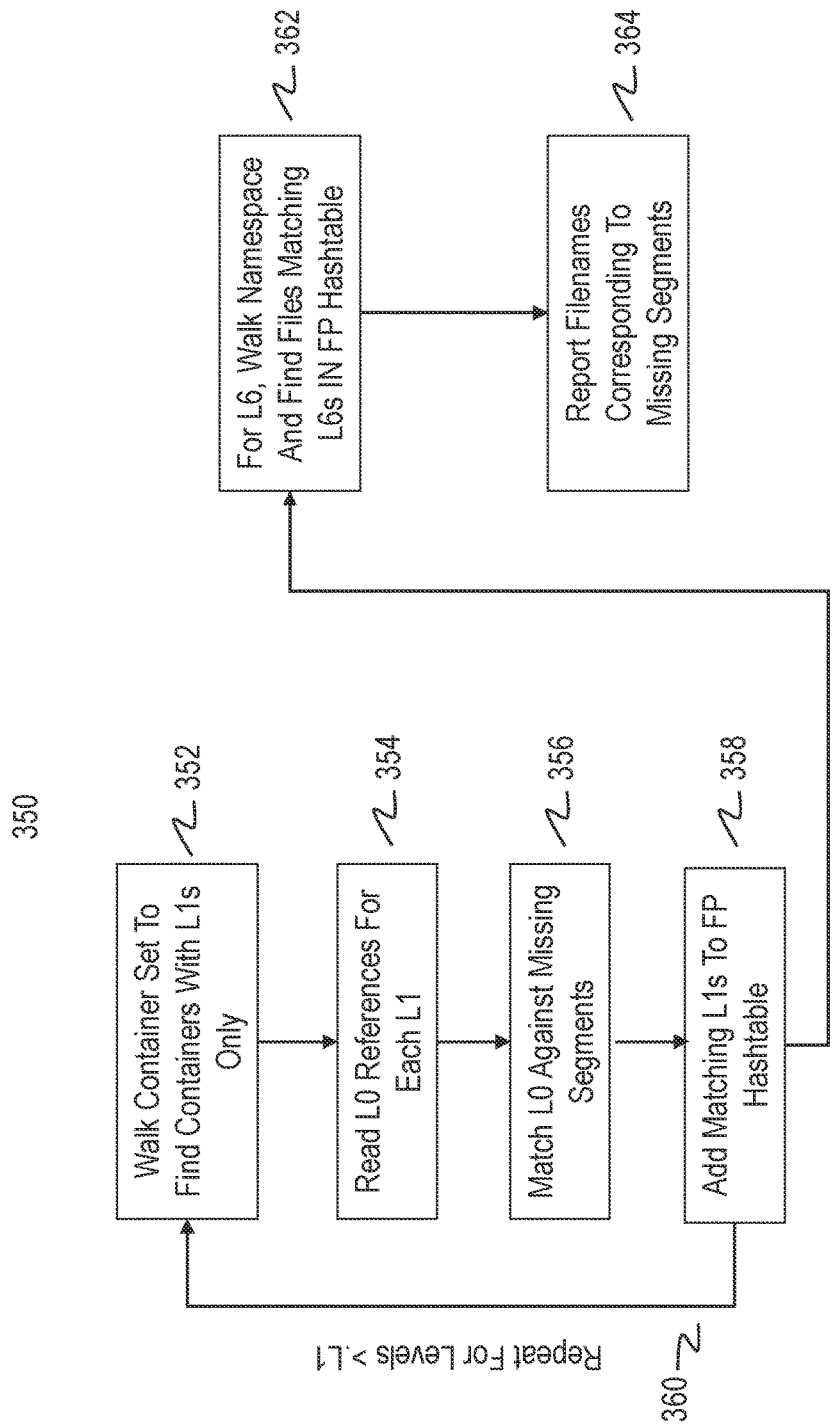
FIG. 3B discloses an example method for identifying files to which missing segments correspond.

Once the missing segments have been identified 318, a method 350 may be used to identify the files to which the missing segments correspond as shown in FIG. 3B. The method 350 may be performed immediately after completion of the method 300, or at any other time. In some embodiments, the methods 300 and 350 may be performed as a single continuous method. Further, the methods 300 and/or 350 may be performed automatically, possibly on an ad hoc basis, or on a regularly scheduled basis. As in the case of the method 300, the method 350 be performed in a data deduplication environment that includes a local tier and/or a cloud storage tier. In some instances, the method 350 may be performed by a data deduplication server. In general however, no particular entity, or entities, are required to perform the method 350.

The method 350 may begin by physically walking a container set 352 to read containers that contain L1s only. For each L1, the corresponding L0 references may be read 354 and compared against the missing segments in the FP hashtable to identify 356 any matches. For any L0s that match a missing segment in the FP table, the L1s to which those L0s correspond may then be added 358 to the FP hashtable. The operations 352-358 may then be repeated 360 for all levels of the tree greater than L1, until L6 is reached. When L6 is reached, the namespace may be walked 362 to find the files corresponding to the L6s in the FP hashtable. For all these files, the filenames corresponding to the missing segments may then be reported 364.

D. Further Discussion

Example embodiments of the invention may provide various useful features and advantages. A non-limiting list of some of these useful features and advantages is shown below.
1. The example embodiments are scalable as they can handle verification on systems that can have large numbers of L0 and Lp segments using the partitioning process discussed previously.
2. In an 'offline' verification model (filesystem is disabled), the entire available system memory can be used for verification. But in case of online verification model (filesystem is enabled and data ingest can be happening), limited amount of memory is available as other DDFS features will heavily consume memory. Handling insufficient in-memory and on-disk space helps to support the example embodiments in 'online' mode (filesystem is enabled). Thus, the example embodiments are designed to work for large capacity and limited memory availability deduplicated file systems.
3. This example embodiments are applicable to cloud and active tier with no changes.
4. Partitioning the FP index table and processing a set of index ranges in each pass as previously described is optimized for IO. In DDFS, the FP index table is an on-disk data structure. So, reading a range of index buckets for comparing enumerated fingerprints and fingerprints entries read from the FP index table is sequential and limits the number of IOs required to read the smaller range of index buckets.
5. This example embodiments perform a physical/breath first scan of the segments when scanning the container set and avoid verifying a segment multiple times even when the same segment can be referenced by other segments due to de-duplication, thus making the process fast. The performance of each container scan is deterministic and can be benchmarked per system. The overall performance when partitioning can be extrapolated as a number of passes times the time for container set scan.

E. Example Methods

It is noted with respect to the disclosed methods, including the example method of FIGS. 3A and 3B, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Some Comparative Examples

Following are some comparative examples that may serve to further clarify and emphasize aspects of some example embodiments of the invention. These examples are provided for the purposes of comparison, and are not intended to limit the scope of the invention in any way.

F.1 Logical File Verification

To check the integrity between segment references, and segments in containers and an index, this approach may provide various checks and background activities running inside the filesystem. File verification may be one such background activity which may run inside a filesystem to ensure the correctness of mapping between segment references and segments, that is, a file verification process may ensure that all segments in the containers are reachable from its segment references. For any segments that are not reachable, a file verification process may report missing segments. If a segment is missing from the container set, and the index does not have a fingerprint corresponding to it, file verification may be used to catch such errors.

A logical file verification approach may be implemented where periodic snapshots are taken to find out the files that need to be verified. Snapshots may be taken at regular intervals and files changed or created between the snapshot diff may be candidates for verification. The file obtained during snapshot diff may be verified if it is closed, otherwise it may be skipped. For all the files that have changed in the snapshot diff, file verification may verify all the segments in the segment tree by doing a depth first walk for each segment. As will be apparent from this discussion, a logical file verification approach has significant limitations.

For example, this approach requires a segment tree walk to verify the reachability of pointers results in random lookups on disk. Random lookups on disk slow down verification performance. Further, an in index lookup is required for each reference, thereby contributing to more random 10 overhead. Because of deduplication, the same segments have to be walked again and again, resulting in the same segments being verified again and again, which needlessly consumes processing resources, and takes time. In logical file verification, once a file has been verified, it will not be checked again due to its poor performance. However, data can be deleted accidentally by the garbage collection process and this kind of corruption will not be detected. On the cloud tier, logical file verification is not even enabled due to performance issues.

For at least the reasons noted above, logical file verification is quite slow. For example, whether employed in an active tier or cloud tier, metadata verification, such as is performed by example embodiments, may take weeks, or even months. Also, over time, this poor performance issue can been exacerbated due to various additional factors, one of which is increasing data storage capacities. In the current data centric world, the storage capacity requirements are increasing. A large capacity system is in the order of petabytes of data today. With the higher storage capacities, the number of data segments is the order of millions/billions. For example, in a 96 TB system, 8 k avg segment size, is 12 billion fingerprints. And storage capacities have gone up to 1.5 PB of data. Increased data storage capacities results in more fingerprints on the system, so the missing segment identifying algorithm has to do more work, making it even slower. In contrast, example embodiments may identify all the missing segments (L0 or Lp) quickly, with minimal disruption and with good performance to the customer.

F.2 Level by Level Checksum

Systems such as DDFS may compute the checksum of all the live references at each segment tree LP level and then that checksum compares against the checksum of all the segments referenced in the next segment tree level (Lp1). This tool incorporates a breadth first, physical scan of the containers to calculate the checksum. This tool takes a couple of hours to complete its operations. However, DDFS does not have enough memory to include the L0 segments in this procedure. This apparatus validates the live LP segment references. But once a checksum mismatch is detected, other, more time consuming tools, like logical verification have to be used to identify all the missing segments and the affected files in the system. Thus, level-by-level checksum verification has significant limitations at least insofar as it can only indicate that there is an inconsistency in the metadata segments, but does not identify the missing segments or the impacted files. That is, this approach provides only metadata checksum verification.

F.3 Physical File Verification

In this approach, a breadth first scan is performed, and then a physical scan of the containers in an attempt to improve on the disadvantages of logical file verification. This approach uses a data structure called PHVEC (perfect hash vector) to enumerate and mark all live references, iterate all the files in the namespace and insert the L6 references into the live vector, iterate all the L6 containers, if the L6 segment fingerprint is set in the live vector, read all its contents (L5 or below references), and insert them into the live vector. Repeat the above process for L5, L4, L3, L2, and L1 and L0 segments.

The physical file verification is similar to the enumeration procedure. The difference is that instead of inserting the contents of the segments into the live vector, the fingerprint of the segment itself is removed from the live vector. If there is no missing L0 segment, at the end of the verification phase, the entire live vector should be 0, else there is a missing Fp. However, some extra work is required to map the bits in the PHVEC to the missing fingerprints and more importantly, the corrupted files. The containers must be scanned again to map the missing bits back to the fingerprints.

A significant caveat when creating the PHVEC is that all the keys are pre-determined and the bit positions are fixed. In DDFS, PHVEC keys are predetermined by iterating index. If there is a fingerprint missing from the Fp index, it can result in a collision. If the missing segment collides with an unused bit, the corruption will be detected. If the missing segment collides with some other live reference, the corruption will NOT be detected. Since there can be collisions in the PHVEC, some missing fingerprints will not be detected. Other procedures, such as logical file verification, must be invoked to perform a more comprehensive verification. However, this may add time, expense, and increased resource consumption.

G. Further Example Embodiments

Following are some further example embodiments of the invention. These are presented only by way of example and are not intended to limit the scope of the invention in any way.

Embodiment 1. A method, comprising: calculating a size of a fingerprint hashtable based on a total number of Ln segments that are included in a namespace and based on available memory and on-disk space; calculating a number of verification passes that are needed based on if the total number of Ln segments fit in the available on-disk space; partitioning a fingerprint index table into a plurality of index ranges corresponding to the number of verification passes needed and determining a start and stop value for each of the index ranges, wherein when only one verification pass is needed, partitioning is not performed, and the entire fingerprint index table is considered as one index range that will be subjected to the one verification pass; and during each verification pass for each index range of the plurality of index ranges of the fingerprint index: (1) finding all Ln segments of a highest level of a tree structure in a namespace, and adding the Ln segments to the fingerprint hashtable and to a walk-vector data structure that is configured to keep track of Ln segments to read and Ln segments for which a read is completed; (2) scanning a container set and locating any Ln segments of the highest level of the tree structure in the container set; (3) for all Ln segments of the highest level of the tree structure that are present in the walk-vector data structure, reading all Ln-1 segments pointed to by the Ln segments and adding the Ln-1 segments to the fingerprint hashtable and to the walk-vector data structure; (4) repeating 1-3 for all levels of the tree structure below the highest level that include Ln segments; and (5) when all levels of the tree structure that include Ln segments have been checked, comparing the fingerprint hashtable with the portion of the fingerprint index table corresponding to the index range to identify any missing Ln segments.

Embodiment 2. The method as recited in embodiment 1, wherein a value of n ranges from 0 to 6, and the tree comprises a Merkle tree.

Embodiment 3. The method as recited in any of embodiments 1-2, wherein each fingerprint is a hash of a respective data segment or a metadata segment.

Embodiment 4. The method as recited in any of embodiments 1-3, wherein the namespace spans a local storage tier and a cloud storage tier.

Embodiment 5. The method as recited in any of embodiments 1-4, wherein the missing fingerprints indicate that a data loss has occurred.

Embodiment 6. The method as recited in any of embodiments 1-5, wherein the levels of the tree are checked from a top of the tree to a bottom of the tree.

Embodiment 7. The method as recited in any of embodiments 1-6, further comprising using the missing fingerprints to identify a file that includes data segments to which the fingerprints correspond.

Embodiment 8. The method as recited in any of embodiments 1-7, wherein a top segment of the tree comprises a hash of an entire file, and the file is identified by walking the namespace and matching the file to the top segment.

Embodiment 9. The method as recited in embodiment 8, wherein the file is identified as missing one or more data segments.

Embodiment 10. The method as recited in any of embodiments 1-9, wherein there is a one-to-one mapping between a [segment,container] pair and the fingerprint index table, and a segment exists if there is a live reference to that segment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
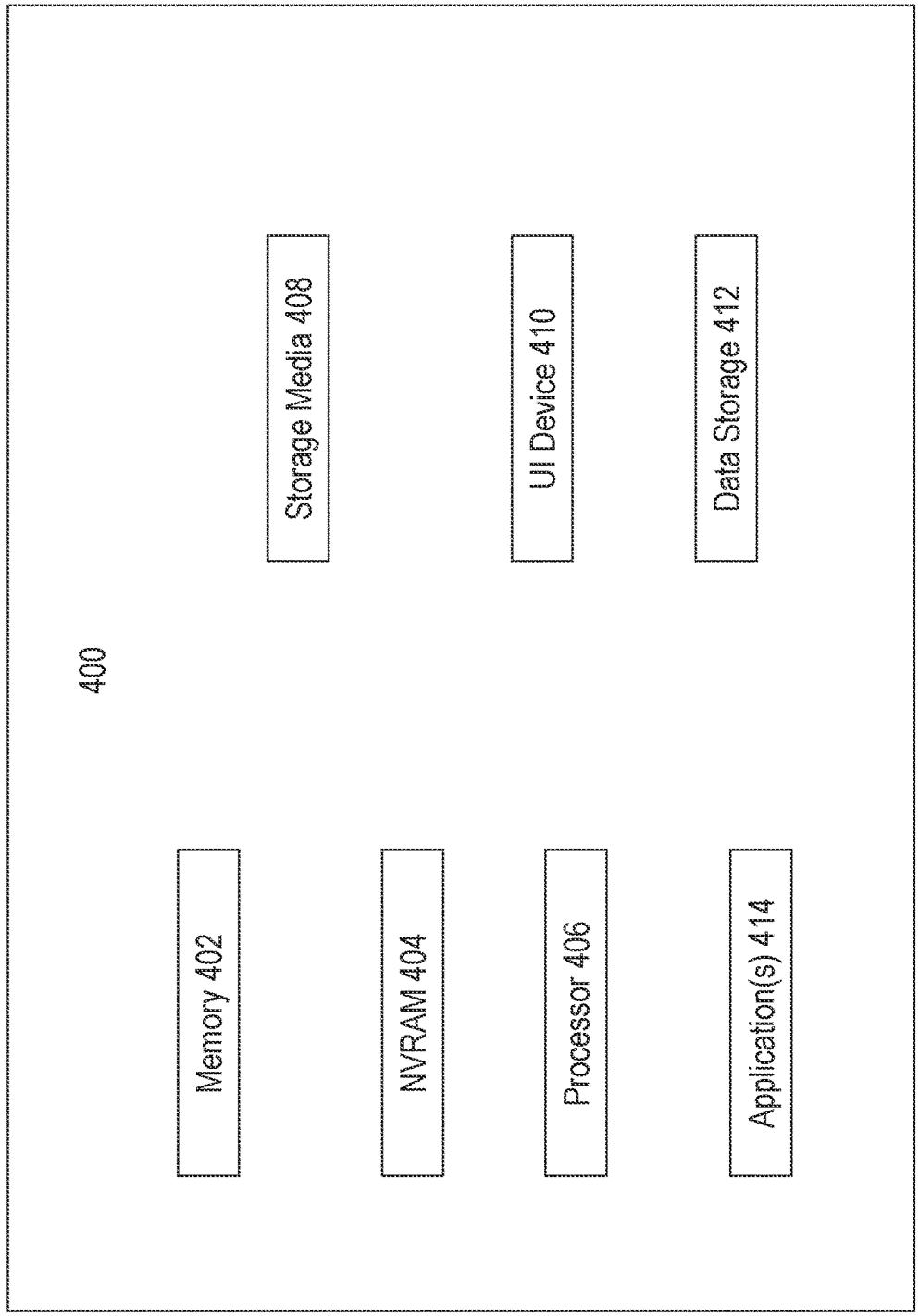
FIG. 4 discloses aspects of an example computing entity operable to perform any of the disclosed methods, processes, and operations.

With reference briefly now to FIG. 4, any one or more of the entities disclosed, or implied, by FIGS. 1A-3C and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI (user interface) device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   calculating a size of a fingerprint hashtable based on a total number of Ln segments that are included in a namespace and based on available memory and on-disk space;
   calculating a number of verification passes that are needed based on if the total number of Ln segments fit in the available on-disk space;
   partitioning a fingerprint index table into a plurality of index ranges corresponding to the number of verification passes needed and determining a start and stop value for each of the index ranges, wherein when only one verification pass is needed, partitioning is not performed, and the fingerprint index table is considered as one index range that will be subjected to the one verification pass, wherein the steps of calculating a size of a fingerprint, calculating a number of verification passes, and partitioning a fingerprint index table occur before any verification pass is performed; and during each verification pass for each index range of the plurality of index ranges of the fingerprint index:
(1) finding all Ln segments of a highest level of a tree structure in a namespace, and adding the Ln segments to the fingerprint hashtable and to a walk-vector data structure that is configured to keep track of Ln segments to read and Ln segments for which a read is completed, wherein the walk-vector data structure uses two bits for each segment, one bit indicating that the segment needs to be read, and one bit indicating that the segment has been read;
(2) scanning a container set and locating any Ln segments of the highest level of the tree structure in the container set;
(3) for all Ln segments of the highest level of the tree structure that are present in the walk-vector data structure, reading all Ln-1 segments pointed to by the Ln segments and adding the Ln-1 segments to the fingerprint hashtable and to the walk-vector data structure;
(4) repeating 1-3 for all levels of the tree structure below the highest level that include Ln segments, and if the fingerprint hashtable becomes full during the verification pass, writing the contents of the fingerprint hashtable to an on-disk file and continuing to add further segment fingerprints to an emptied fingerprint hashtable; and
(5) when all levels of the tree structure that include Ln segments have been checked, comparing the fingerprint hashtable with the portion of the fingerprint index table corresponding to the index range to identify any missing Ln segments.

2. The method as recited in claim 1, wherein a value of n ranges from 0 to 6, and the tree comprises a Merkle tree.

3. The method as recited in claim 1, wherein each fingerprint is a hash of a respective data segment or metadata segment.

4. The method as recited in claim 1, wherein the namespace spans a local storage tier and a cloud storage tier.

5. The method as recited in claim 1, wherein the missing fingerprints indicate that a data loss has occurred.

6. The method as recited in claim 1, wherein the levels of the tree are checked from a top of the tree to a bottom of the tree.

7. The method as recited in claim 1, further comprising using the missing fingerprints to identify a file that includes data segments to which the fingerprints correspond.

8. The method as recited in claim 1, wherein a top segment of the tree comprises a hash of an entire file, and the file is identified by walking the namespace and matching the file to the top segment.

9. The method as recited in claim 8, wherein the file is identified as missing one or more data segments.

10. The method as recited in claim 1, wherein there is a one-to-one mapping between a [segment, container] pair and the fingerprint index table, and a segment exists if there is a live reference to that segment.

11. A non-transitory storage medium having stored therein instructions that are executable by one or more hardware processors to perform operations comprising:

calculating a size of a fingerprint hashtable based on a total number of Ln segments that are included in a namespace and based on available memory and on-disk space;

calculating a number of verification passes that are needed based on if the total number of Ln segments fit in the available on-disk space;

partitioning a fingerprint index table into a plurality of index ranges corresponding to the number of verification passes needed and determining a start and stop value for each of the index ranges, wherein when only one verification pass is needed, partitioning is not performed, and the fingerprint index table is considered as one index range that will be subjected to the one verification pass, wherein the steps of calculating a size of a fingerprint, calculating a number of verification passes, and partitioning a fingerprint index table occur before any verification pass is performed; and during each verification pass for each index range of the plurality of index ranges of the fingerprint index:
(1) finding all Ln segments of a highest level of a tree structure in a namespace, and adding the Ln segments to the fingerprint hashtable and to a walk-vector data structure that is configured to keep track of Ln segments to read and Ln segments for which a read is completed, wherein the walk-vector data structure uses two bits for each segment, one bit indicating that the segment needs to be read, and one bit indicating that the segment has been read;
(2) scanning a container set and locating any Ln segments of the highest level of the tree structure in the container set;
(3) for all Ln segments of the highest level of the tree structure that are present in the walk-vector data structure, reading all Ln-1 segments pointed to by the Ln segments and adding the Ln-1 segments to the fingerprint hashtable and to the walk-vector data structure;
(4) repeating 1-3 for all levels of the tree structure below the highest level that include Ln segments, and if the fingerprint hashtable becomes full during the verification pass, writing the contents of the fingerprint hashtable to an on-disk file and continuing to add further segment fingerprints to an emptied fingerprint hashtable; and
(5) when all levels of the tree structure that include Ln segments have been checked, comparing the fingerprint hashtable with the portion of the fingerprint index table corresponding to the index range to identify any missing Ln segments.

12. The non-transitory storage medium as recited in claim 11, wherein a value of n ranges from 0 to 6, and the tree comprises a Merkle tree.

13. The non-transitory storage medium as recited in claim 11, wherein each fingerprint is a hash of a respective data segment or metadata segment.

14. The non-transitory storage medium as recited in claim 11, wherein the namespace spans a local storage tier and a cloud storage tier.

15. The non-transitory storage medium as recited in claim 11, wherein the missing fingerprints indicate that a data loss has occurred.

16. The non-transitory storage medium as recited in claim 11, wherein the levels of the tree are checked from a top of the tree to a bottom of the tree.

17. The non-transitory storage medium as recited in claim 11, wherein the operations further comprise using the missing fingerprints to identify a file that includes data segments to which the fingerprints correspond.

18. The non-transitory storage medium as recited in claim 11, wherein a top segment of the tree comprises a hash of an entire file, and the file is identified by walking the namespace and matching the file to the top segment.

19. The non-transitory storage medium as recited in claim 18, wherein the file is identified as missing one or more data segments.

20. The non-transitory storage medium as recited in claim 11, wherein there is a one-to-one mapping between a [segment,container] pair and the fingerprint index table, and a segment exists if there is a live reference to that segment.

* * * * *